US009463690B2

(12) United States Patent
Yager et al.

(10) Patent No.: US 9,463,690 B2
(45) Date of Patent: *Oct. 11, 2016

(54) NECK ASSEMBLY

(71) Applicant: Salflex Polymers Limited, Weston (CA)

(72) Inventors: Jeff Yager, LaSalle (CA); Daniel Butum, Commerce Township, MI (US); William Matthew Foster, White House, TN (US)

(73) Assignee: Salflex Polymers Limited, Weston, Ontario (CA)

( * ) Notice: Subject to any disclaimer, the term of this patent is extended or adjusted under 35 U.S.C. 154(b) by 76 days.

This patent is subject to a terminal disclaimer.

(21) Appl. No.: 14/101,526

(22) Filed: Dec. 10, 2013

(65) Prior Publication Data

US 2014/0096835 A1    Apr. 10, 2014

Related U.S. Application Data

(63) Continuation of application No. 13/044,286, filed on Mar. 9, 2011, now Pat. No. 8,622,102.

(60) Provisional application No. 61/312,461, filed on Mar. 10, 2010.

(51) Int. Cl.
*B60K 15/04*    (2006.01)
*B60K 15/03*    (2006.01)

(52) U.S. Cl.
CPC ............. *B60K 15/04* (2013.01); *B60K 15/03* (2013.01); *B60K 15/03177* (2013.01); *B60K 2015/03447* (2013.01); *B60K 2015/03453* (2013.01); *B60K 2015/0477* (2013.01); *Y10T 29/49826* (2015.01); *Y10T 137/0318* (2015.04); *Y10T 137/6011* (2015.04)

(58) Field of Classification Search
CPC ............ B60K 15/04; B60K 2015/047; B60K 2015/0477
USPC ................................. 141/350; 220/86.1, 86.2
See application file for complete search history.

(56) References Cited

U.S. PATENT DOCUMENTS

| | | |
|---|---|---|
| 3,927,158 A | 12/1975 | Croft et al. |
| 4,357,293 A | 11/1982 | Williamson, Jr. |
| 4,426,095 A | 1/1984 | Buttner |
| 4,690,293 A | 9/1987 | Uranishi et al. |
| 4,813,453 A | 3/1989 | Jenkins et al. |
| 5,056,492 A | 10/1991 | Banse |

(Continued)

FOREIGN PATENT DOCUMENTS

| | | |
|---|---|---|
| EP | 0764517 | 3/1997 |
| WO | 2008/145246 | 12/2008 |

*Primary Examiner* — Mark A Laurenzi
*Assistant Examiner* — Timothy P Kelly
(74) *Attorney, Agent, or Firm* — Miller Canfield

(57) ABSTRACT

A neck assembly of a fuel system component comprises a housing. The housing comprises a sleeve having a first end portion positioned exterior to the fuel system component and a longitudinally opposed second end portion. The housing further comprises an encapsulation ring extending radially outwardly from the second end portion of the sleeve and encapsulated within a wall of the fuel system component. The neck assembly further comprises a valve cartridge at least partially received within the sleeve and secured thereto. The valve cartridge comprises a conduit having a first end portion positioned exterior to the fuel system component and a longitudinally opposed second end portion.

34 Claims, 10 Drawing Sheets

(56) References Cited

U.S. PATENT DOCUMENTS

| | | |
|---|---|---|
| 5,613,476 A | 3/1997 | Oi et al. |
| 6,474,376 B2 | 11/2002 | Hagano et al. |
| 6,533,288 B1 | 3/2003 | Brandner et al. |
| 6,880,594 B1 | 4/2005 | Benjey |
| 6,945,290 B1 | 9/2005 | Benjey et al. |
| 7,082,964 B1 | 8/2006 | Yoshizawa et al. |
| 7,124,917 B2 | 10/2006 | Lee |
| 7,306,017 B2 | 12/2007 | Walkowski et al. |
| 7,565,986 B2 * | 7/2009 | Brandner et al. ............. 220/563 |
| 7,647,955 B2 | 1/2010 | Murabayashi et al. |
| 7,690,362 B2 | 4/2010 | Pike et al. |
| 7,997,307 B2 | 8/2011 | Benjey |
| 8,622,102 B2 * | 1/2014 | Yager et al. ................... 141/350 |
| 2003/0116202 A1 | 6/2003 | Krishnamoorthy et al. |
| 2006/0162812 A1 | 7/2006 | Walkowski et al. |
| 2011/0079322 A1 | 4/2011 | Beier et al. |
| 2011/0162754 A1 | 7/2011 | Murabayashi et al. |
| 2014/0217094 A1 * | 8/2014 | Wolf ............................ 220/86.2 |

* cited by examiner

NECK ASSEMBLY

CROSS-REFERENCE TO RELATED APPLICATION

This application claims the benefit of and priority to U.S. Provisional Patent Application No. 61/312,461, filed Mar. 10, 2010, the entire contents of which are hereby incorporated by reference.

FIELD

The disclosure relates to a neck assembly for a fuel system component, such as a fuel tank. Specifically, the disclosure relates to a neck assembly for a fuel system component that is made by blow molding.

INTRODUCTION

The following is not an admission that anything discussed below is prior art or part of the common general knowledge of persons skilled in the art.

U.S. Pat. No. 6,860,398 (Potter et al.) discloses low permeation fittings and low permeation plastic containers using the low permeating fittings. The low permeation fittings and low permeation plastic containers are constructed by molding an outer component into the wall of a plastic container while it is being formed. This causes the opening of a passageway in the outer component to be covered with wall forming material. The inner component is then inserted into the outer component through the wall forming material thereby trapping the wall material between the internal and external components. The barrier layer of the container wall is therefore continuous from the container to inside the fitting. A new fuel container, fuel neck fitting, and flange for mounting components on a fuel tank are disclosed.

SUMMARY

The following summary is provided to introduce the reader to the more detailed discussion to follow. The summary is not intended to limit or define the claims.

According to one aspect, a neck assembly of a fuel system component is provided. The neck assembly comprises a housing. The housing comprises a sleeve having a first end portion positioned exterior to the fuel system component and a longitudinally opposed second end portion. The housing further comprises an encapsulation ring extending radially outwardly from the second end portion of the sleeve and encapsulated within a wall of the fuel system component. The neck assembly further comprises a valve cartridge at least partially received within the sleeve and secured thereto. The valve cartridge comprises a first end portion positioned exterior to the fuel system component and a longitudinally opposed second end portion. The valve cartridge defines a conduit for fluid flow. At least one separate annular seal is disposed between any two of the sleeve, the valve cartridge, and the wall of the fuel system component.

The at least one annular seal may comprise a first seal disposed between the sleeve and the valve cartridge. The valve cartridge may comprise an outer surface and the sleeve may comprise an inner surface. The outer surface of the valve cartridge may be in facing relation to the inner surface of the sleeve. At least one of the outer surface of the valve cartridge and the inner surface of the sleeve may comprise a recess in which the first seal is seated.

The neck assembly may further comprise a second annular seal disposed between the valve cartridge and the wall of the fuel system component. The valve cartridge may comprise a shoulder positioned in facing relation to an outer surface of the wall of the fuel system component, and the second seal may be disposed between the shoulder and the outer surface of the fuel system component. The shoulder may comprise a recess in which the second seal is seated.

The at least one annular seal may be made from a resiliently flexible material.

The housing may further comprise at least one sleeve connector at the first end portion of the sleeve, and the valve cartridge may further comprise at least one valve cartridge connector at the first end portion of the valve cartridge. The valve cartridge connector may be engaged with the sleeve connector to secure the valve cartridge to the housing.

The sleeve may be metal, and the encapsulation ring may be laser welded to the sleeve.

The second end portion of the valve cartridge may extend proud of the second end portion of the sleeve and may be positioned within the fuel system component. The second end portion of the valve cartridge may have a valve assembly mounted thereto. Alternately, the second end portion of the valve cartridge may include a valve. The valve may be selected from the group consisting of a rollover valve, a check valve, a fill limit vent valve, and a grade vent valve.

According to another aspect, a neck assembly of a fuel system component is disclosed. The neck assembly comprises a housing. The housing comprises a sleeve having a first end portion positioned exterior to the fuel system component and a longitudinally opposed second end portion. An encapsulation ring extends outwardly from the second end portion of the sleeve and is encapsulated within a wall of the fuel system component. At least one sleeve connector is at the first end portion of the sleeve. The neck assembly further comprises a valve cartridge at least partially received within the sleeve and defining a conduit for fuel flow. The valve cartridge comprises a first end portion positioned exterior to the fuel system component and a longitudinally opposed second end portion. At least one valve cartridge connector is at the first end portion of the valve cartridge. The valve cartridge connector is engaged with the sleeve connector to secure the valve cartridge within the housing.

The at least one sleeve connector may be integral with the sleeve, and the at least one valve cartridge connector may be integral with the valve cartridge.

The at least one valve cartridge may comprise an outer surface, and at least one recess defined in the outer surface. The at least one sleeve connector may comprise at least one protrusion extending inwardly from the sleeve and protruding into the at least one recess.

The at least one recess may comprise a plurality of recesses extending around the outer surface of the valve cartridge. The at least one protrusion may comprise a plurality of tabs extending inwardly from the sleeve. Each of the tabs may protrude into one of the recesses.

Alternately, the at least one recess may comprise a single annular recess extending around the outer surface of the valve cartridge. The at least one protrusion may comprise a plurality of tabs extending inwardly from the sleeve and protruding into the annular recess. The recess may comprise a base surface facing towards the first end portion of the conduit, and the tabs may have a proximal end connected to the sleeve and an opposed distal end that abuts the base surface.

The sleeve may be a metal, and the plurality of tabs comprise may comprise cutouts that are bent into the recess upon assembly.

The valve cartridge may comprise a lip having a first portion extending laterally radially outwardly from the first end portion of the valve cartridge and a second portion extending axially towards the second end portion of the valve cartridge. The lip may define a slot in which the first end portion of the sleeve is received.

The sleeve connector may comprise at least one aperture formed through the first end portion of the sleeve, and the valve cartridge connector may comprise at least one protrusion extending inwardly from the second portion of the lip and received within the aperture.

The lip may be resiliently flexible to allow for the protrusion to be removed from the aperture. The valve cartridge may be removably secured within the housing. In other words, the valve cartridge may be removable from the housing.

According to another aspect, a neck assembly of a fuel system component is disclosed. The neck assembly comprises a housing. The housing comprises a metal sleeve having a first end portion positioned exterior to the fuel system component and a longitudinally opposed second end portion. The housing further comprises a metal encapsulation ring that is welded to the second end portion of the sleeve and extends radially outwardly from the second end portion of the sleeve. The encapsulation ring is encapsulated within a wall of the fuel system component. A valve cartridge is at least partially received within the sleeve and secured thereto. The valve cartridge defines a conduit for fuel flow, and comprises a first end portion positioned exterior to the fuel system component and a longitudinally opposed second end portion.

According to another aspect, a method for securing a neck assembly to a fuel system component is disclosed. The method comprises a) providing a housing comprising i) a sleeve having a first end portion and a longitudinally opposed second end portion, and (ii) an encapsulation ring extending radially outwardly from the second end portion of the sleeve; b)

encapsulating the encapsulation ring in a wall of the fuel system component while blow-molding the fuel system component, whereby the first end portion of the sleeve is positioned exterior to the fuel system component; c) providing a valve cartridge defining a conduit for fuel flow and comprising a first end portion and a longitudinally opposed second end portion; d)

inserting the valve cartridge into the sleeve from the first end portion of the sleeve towards the second end portion, whereby the first end portion of the valve cartridge is positioned exterior to the wall of the fuel system component; and e) securing the valve cartridge to the sleeve.

The method may further comprise sealing the valve cartridge to at least one of the sleeve and the wall of the fuel system component. Sealing the valve cartridge to the sleeve may comprise mounting at least one separate annular seal to the valve cartridge prior to step (d), and compressing the at least one annular seal between the valve cartridge and one of the sleeve and the wall of the fuel system component during step (e). Alternately, sealing the valve cartridge to the sleeve comprises mounting a first separate annular seal and a second separate annular seal to the valve cartridge prior to step (d), and compressing the first annular seal between the valve cartridge and the sleeve and the second annular seal between the valve cartridge and the wall of the fuel system component during step (e).

The first end portion of the sleeve may comprise at least one tab. The valve cartridge may comprise an outer surface, and the first end portion of the valve cartridge may comprise at least one recess formed in the outer surface. Step (e) may comprise crimping the at least one tab into the at least one recess.

The valve cartridge may comprise a lip having a first portion extending radially outwardly from the first end portion of the valve cartridge and a second portion extending axially towards the second end portion of the valve cartridge. The lip may a have slot. The method may further comprise inserting the first end portion of the sleeve into the slot while inserting the valve cartridge into the sleeve.

At least one aperture may be formed through the first end portion of the sleeve. At least one protrusion may extend inwardly from the second portion of the lip. Step (e) may comprise snapping the protrusion into the aperture while inserting the valve cartridge into the sleeve.

The sleeve may be metal, the encapsulation ring may be metal, and step (a) may comprise laser welding the encapsulation ring to the second end portion of the sleeve.

The method may further comprise mounting a valve assembly to the second end portion of the conduit prior to inserting the conduit into the sleeve.

DRAWINGS

Reference is made in the detailed description to the accompanying drawings, in which.

DETAILED DESCRIPTION

No example described below limits any claimed invention and any claimed invention may cover processes or apparatuses that are not described below. The claimed inventions are not limited to apparatuses or processes having all of the features of any one apparatus or process described below or to features common to multiple or all of the apparatuses described below.

Figure 1:
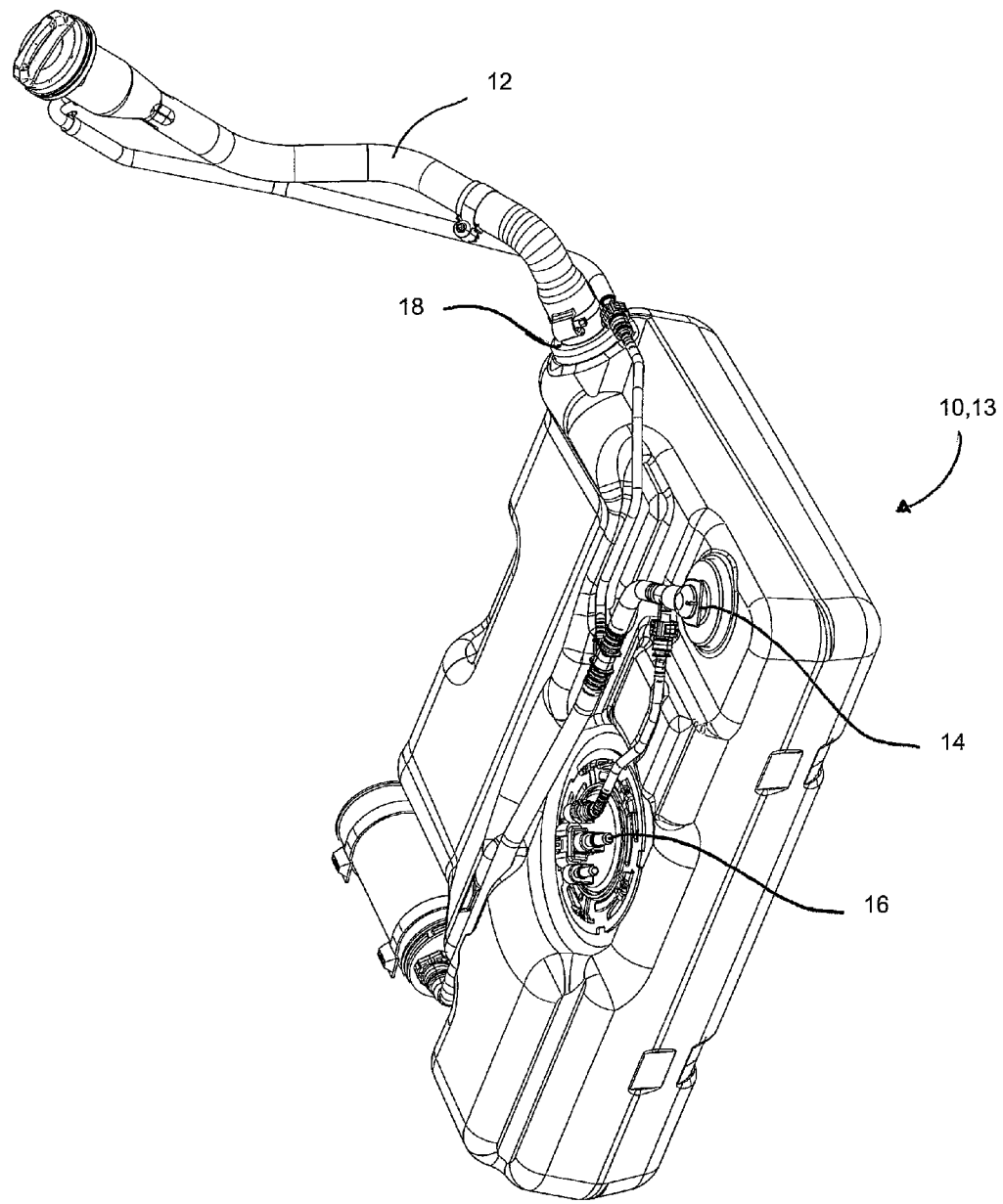
FIG. 1 is a perspective view of a fuel tank including a neck assembly.

Referring to FIG. 1, an example of a fuel system component 10 is shown. The fuel system component 10 is a fuel tank 13 for storing fuel. A fuel filler pipe 12 is provided for conveying fuel into the fuel tank 13. A ventilation system 14 aids in vapor displacement when introducing liquid fuel into the tank 10. An exit port 16 controls the release of the stored liquid fuel for use elsewhere in the system. A neck assembly 18 is used to connect the fuel tank 13 to the fuel filler pipe 12.

As will be described in further detail, the neck assembly 18 is secured to the fuel tank 13 by encapsulation. In this process, a portion of the assembly 18 is placed into the forming tool during the tank molding process and is exposed to the plastic of the fuel tank 13 while the plastic of the fuel tank 13 is in its liquid state so it can envelop, i.e. encapsulate, a portion of the neck assembly 18, thereby creating a hermetic seal between the two components.

Figure 2:
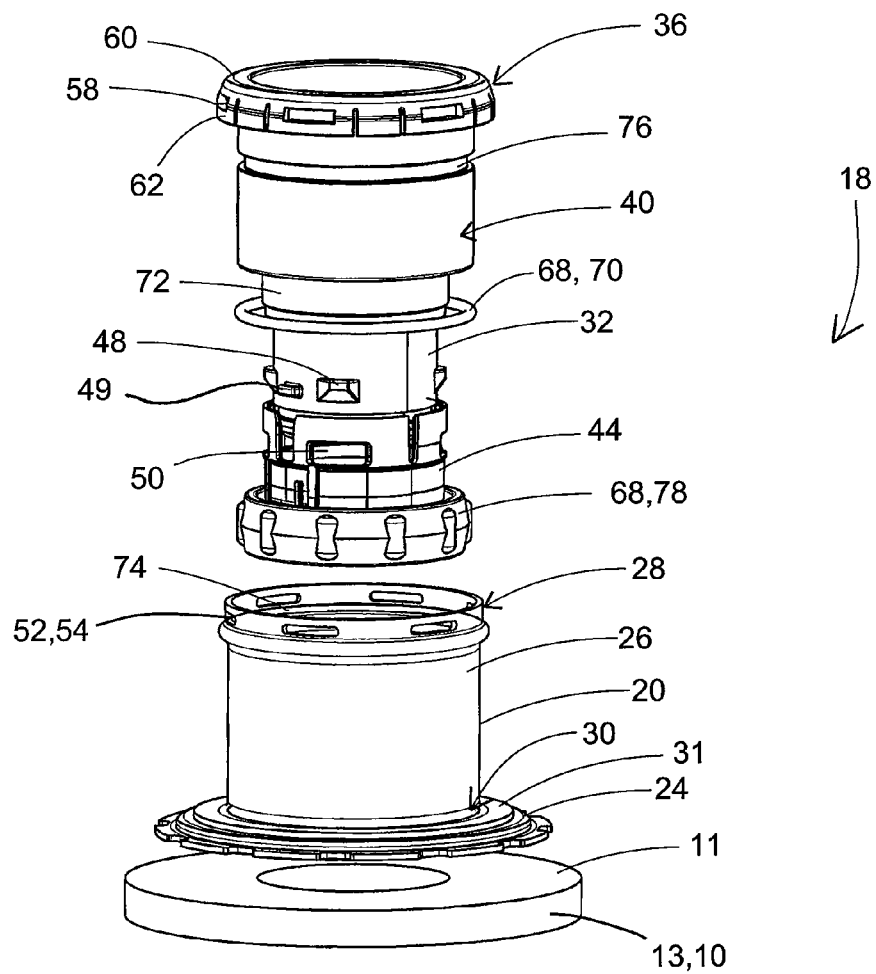
FIG. 2 is a perspective exploded view of the neck assembly of FIG. 1, also showing a check valve, and a portion of the fuel tank of FIG. 1.
Figure 3:
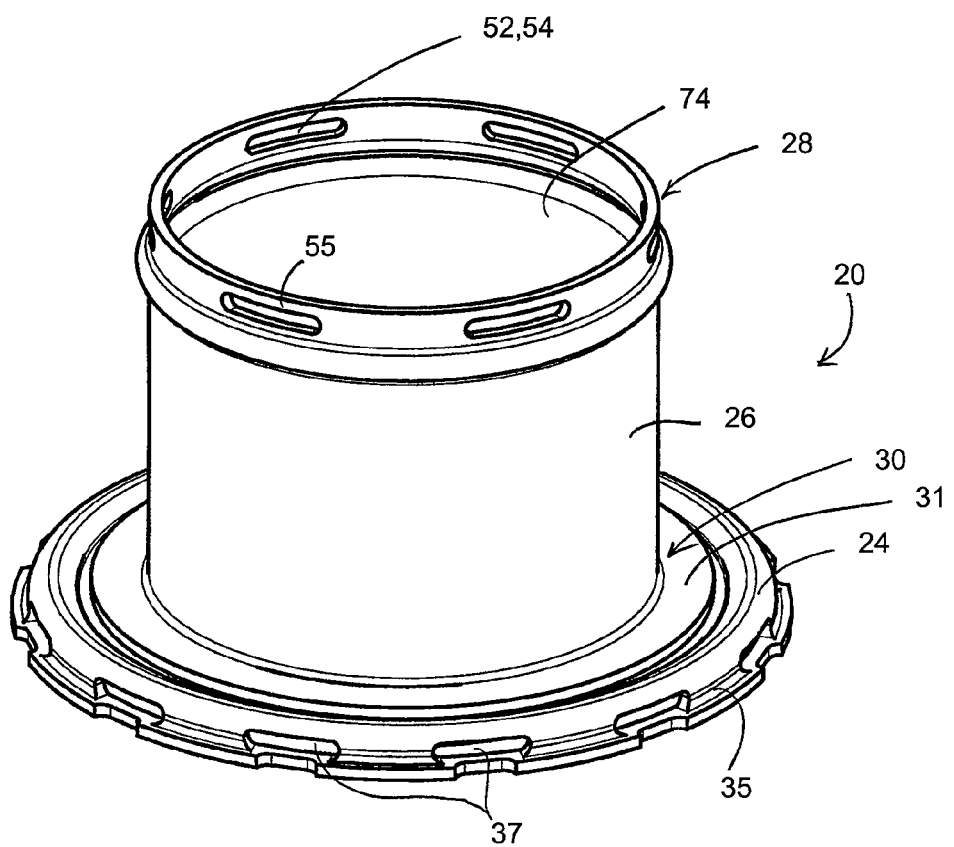
FIG. 3 is a perspective view of the housing of the neck assembly of FIG. 1.

Referring to FIGS. 2 and 3 the neck assembly 18 includes a housing 20. The housing 20 includes a sleeve 26 (also known as a spud), and an encapsulation ring 24. The sleeve 26 is generally cylindrical, and has a first end portion 28 and a longitudinally opposed second end portion 30. The second end portion 30 has a flange 31 extending radially outwardly therefrom.

Figure 4:
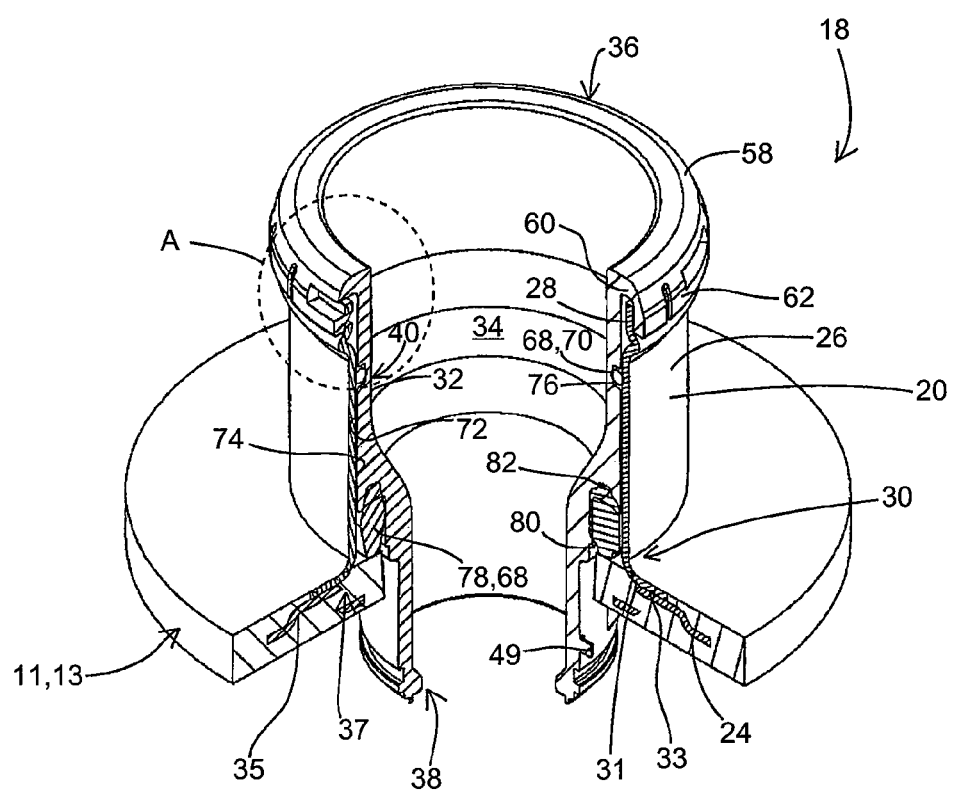
FIG. 4 is a cut-away perspective view of the neck assembly of FIG. 1.

Referring to FIGS. 3 and 4, the encapsulation ring 24 extends radially outwardly from the second end portion 30 of the sleeve 26. In the example shown, the encapsulation ring 24 is separately formed from the sleeve 26 and secured to the sleeve 26. Specifically, the sleeve 26 and encapsulation ring 24 are made from metal. The encapsulation ring 24 comprises a shelf 33 that is positioned below and in facing relation to the flange 31 of the sleeve 26. The flange 31 and the shelf 33 are welded together, for example by laser welding.

In alternate examples, the encapsulation ring 24 may be spot welded, or MIG welded to the sleeve 26. In such examples, the metal may be coated or protected from corrosion. In further alternate examples, the encapsulation ring 24 may be mechanically secured to the sleeve 26, such as by using a toggle lock. In yet further alternate examples, the encapsulation ring 24 may be adhered to the sleeve 26. In yet further alternate examples, the encapsulation ring 24 may be integrally formed with the sleeve 26. Specifically, the encapsulation ring 24 and sleeve 26 may be manufactured from a plastic, and may be integrally molded. In such examples, the housing 20 may be made from a suitable resin which can withstand the molding of the tank 10.

Referring to FIG. 4, as the fuel tank 13 is being molded, the encapsulation ring 24 is encapsulated in a wall 11 of the fuel tank 13 such that the sleeve 26 extends outwards from the surface of the tank 13, and the first end portion 28 of the sleeve is positioned exterior to the fuel tank 13. In the example shown, the second end portion 30 of the sleeve, including the flange 31, is also encapsulated. The encapsulation of the encapsulation ring 24 anchors the housing 20 to the fuel tank 13. Referring still to FIGS. 3, and 4, the encapsulation ring comprises various contours 35 and apertures 37, which serve to allow the plastic of the fuel tank to envelop and form around the encapsulation ring 24 during molding, to securely anchor the encapsulation ring 24 to the fuel tank 13.

Encapsulation during molding of such components is well known in the art and will not be discussed in further detail herein.

Figure 5:
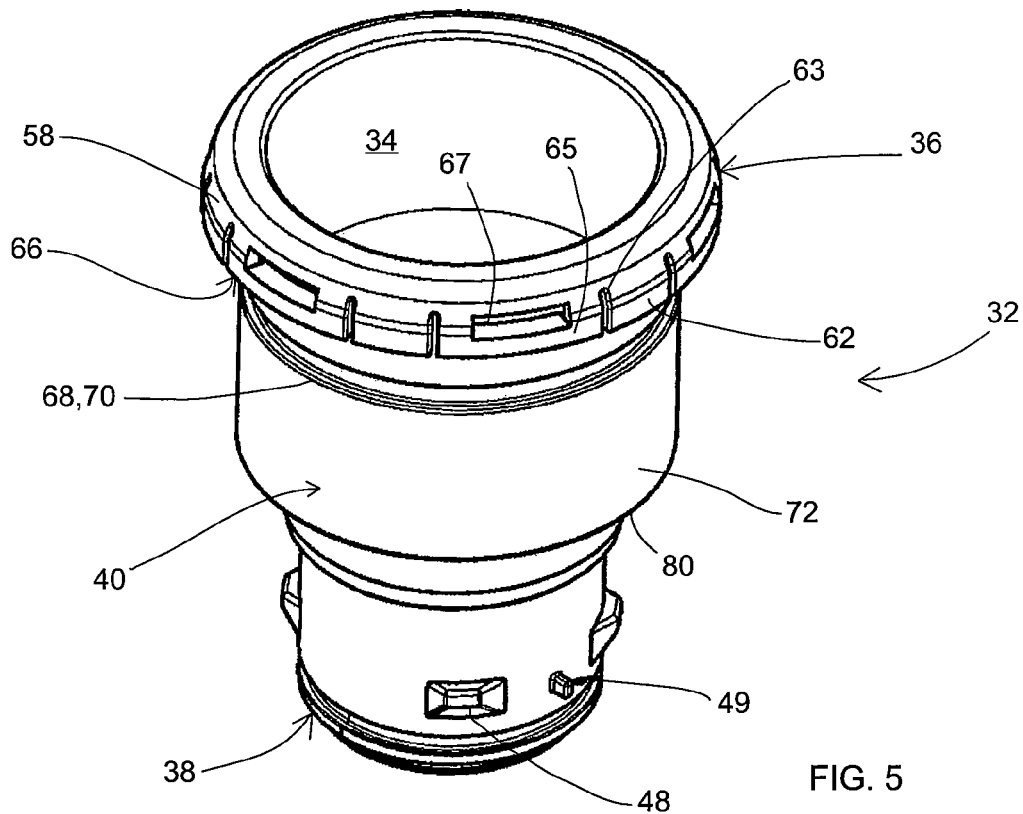
FIG. 5 is a perspective view of a valve cartridge of the neck assembly of FIG. 1.

Referring to FIGS. 2, 4, and 5, the neck assembly 18 further includes a valve cartridge 32. The valve cartridge 32 defines a conduit 34 (shown in FIGS. 4 and 5) through which fluid, such as fuel, may flow. The valve cartridge 32 has a first end portion 36 and a longitudinally opposed second end portion 38. Referring to FIG. 4, the valve cartridge 32 is at least partially received within the sleeve 26, such that the first end portion 36 of the valve cartridge is positioned exterior to the fuel tank 13, and is sealed and secured to the sleeve 26. As shown, a central portion 40 of the valve cartridge 32 is received within the sleeve 26, and the first end portion 36 and the second end portion 38 of the valve cartridge 32 extend proud of the first end portion 28 and second end portion 30 of the sleeve 26, respectively. Specifically, the first end portion 36 of the conduit 34 extends proud of the first end portion 28 of the sleeve 26. The second end portion 38 of the conduit 34 extends proud of the second end portion 30 of the sleeve 26 and is received within the fuel tank 13. In alternate examples, one or both of the first end portion 36 of the valve cartridge and the second end portion 38 of the valve cartridge may be received within the sleeve 26.

Figure 6:
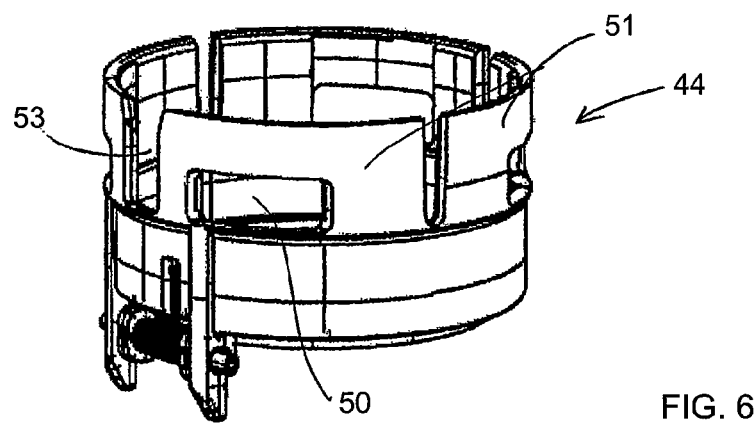
FIG. 6 is a perspective view of the internal check valve of FIG. 2.

Referring to FIG. 5, the second end portion 38 of the valve cartridge is configured to have a valve assembly 44 mounted thereto. An example of a valve assembly 44 is shown in FIG. 6. As exemplified, the valve assembly 44 is an internal check valve, which may be configured to allow fluid to flow into but not out of the fuel tank. In alternate examples, the valve assembly may be a rollover valve, a fill limit vent valve, a grade vent valve, or any other suitable liquid discriminated valve. The valve assembly 44 may be connected to the second end portion 38 of the valve cartridge 32 in any suitable manner.

With reference still to FIG. 5, in the example shown, the valve cartridge 32 includes a plurality of protrusions 48 extending radially outwardly therefrom adjacent the second end portion 38 thereof. A plurality of guide tabs 49 are positioned between the protrusions 48. With reference to FIG. 6, the valve assembly 44 includes a plurality of flaps 51, which are separated by axial slots 53. Each flap 51 has an aperture 50 extending radially therethrough. The second end portion 38 of the valve cartridge 32 may be inserted into the valve assembly 44 while flexing the flaps 51 outwardly over the protrusions 48. The guide tabs 49 may be aligned with and inserted into the slots 53, to ensure that the apertures 50 are aligned with the protrusions 48. As the valve cartridge 32 is inserted into the valve assembly, the protrusions 48 will snap into the apertures 50, to secure the valve assembly 44 on the valve cartridge 32. One or more seals (not shown) may be provided to seal the valve assembly 44 to the valve cartridge 32.

In alternate examples, the valve assembly 44 or a portion thereof may be integrally formed with the second end portion of the valve cartridge 32.

As mentioned hereinabove the valve cartridge 32 is secured to the sleeve 26. Specifically, referring to FIG. 3, the sleeve 26 includes a plurality of sleeve connectors 52 at the first end portion 28 thereof. In the example shown, the sleeve connectors 52 each include an aperture 54 that is formed through the first end portion 28 of the sleeve 26. The apertures 54 are positioned circumferentially around the sleeve 26. A rim 55 is positioned axially above the apertures 54.

Figure 4A:
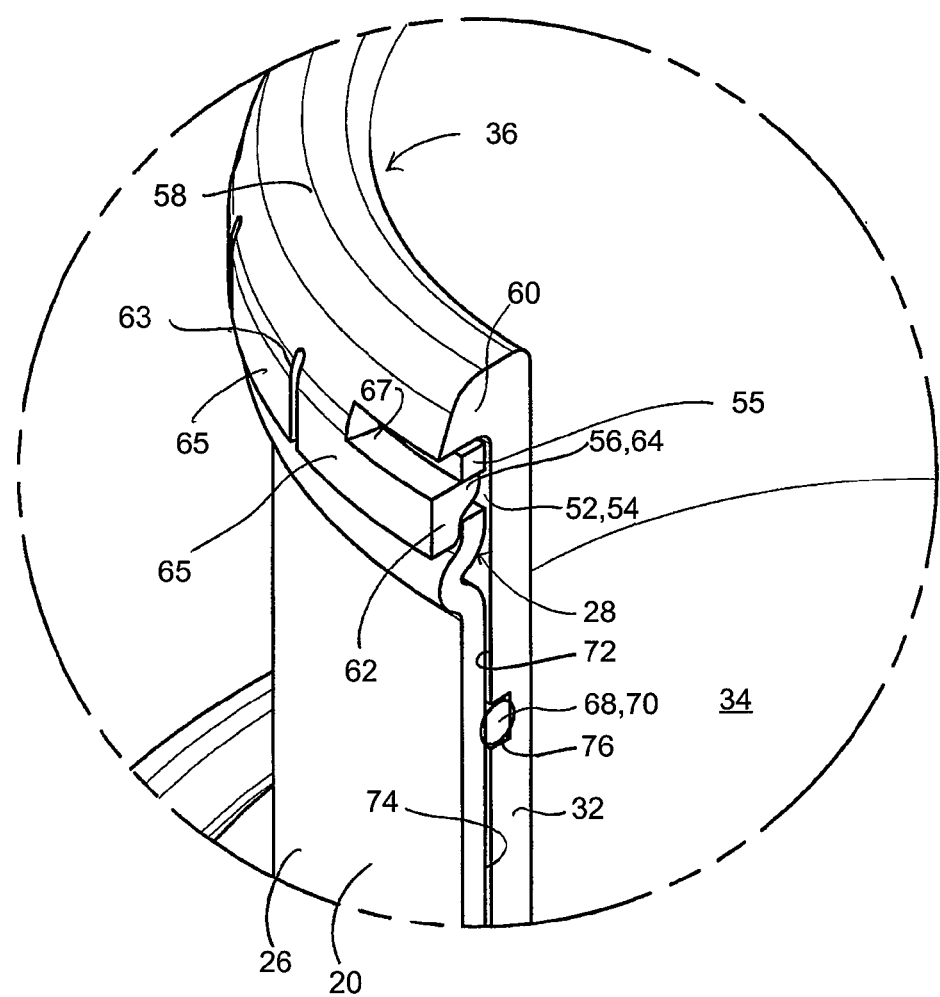
FIG. 4A is en enlarged view of the region shown in circle A in FIG. 4.

Further, the valve cartridge 32 includes a plurality of valve cartridge connectors 56 at the first end portion 36 thereof. Specifically, referring to FIG. 4A, the valve cartridge 32 includes a lip 58 having a first portion 60 extending radially outwardly from the first end portion 36 of the valve cartridge 32 and a second portion 62 extending axially towards the second end portion 38 of the valve cartridge 32. The lip 58 defines a slot 66 (shown in FIG. 5). The second end portion 62 of the lip comprises a plurality of axially extending slits 63, which define a plurality of flaps 65 on the second end portion 62 of the lip 58. The flaps 65 are resiliently flexible. Every other flap 65 includes a protrusion 64 extending radially inwardly therefrom, and an aperture 67 above the protrusion 64. The protrusions 64 are positioned to be circumferentially aligned with the apertures 37 of the housing 26. The protrusions 64 each define a valve cartridge connector 56.

The valve cartridge connectors 56 engage with the sleeve connectors 52 to secure the valve cartridge 32 within the housing 20. Specifically, referring still to FIGS. 4 and 4A, in order to mount the valve cartridge 32 to the housing 26, the second end portion 38 of the valve cartridge 32 may be inserted into the first end portion 28 of the housing 26, and slid axially into the housing 26. As the first end portion 36 of the valve cartridge approaches the first end portion 28 of the sleeve, the first end portion 28 of the sleeve 26 will enter the slot 66. The rim 55 will contact the protrusions 64, and force the flaps 65 to flex radially outwardly. As the valve cartridge 32 is slid further into the housing 26, the flaps 65 will snap radially inwardly, so that the protrusions 64 are inserted into the apertures 54. Accordingly, when the valve cartridge 32 is secured to the sleeve 26, the second end portion 30 of the sleeve 26 is received in the slot 66, and the protrusions 64 are received within the apertures 54.

In the example shown, the valve cartridge 32 is removably secured within the housing 20. Specifically, in order to remove the valve cartridge 32 from the housing 20, the flaps 65 may be flexed radially outwardly, for example by manually gripping the flaps 65, to remove the protrusions 64 from the apertures 50, and the valve cartridge 32 may be slid out of the sleeve 26.

In the example shown, the sleeve 26 includes a plurality of sleeve connectors 52, and the valve cartridge 32 includes a plurality of valve cartridge connectors 56. In alternate examples, the sleeve 26 and valve cartridge 32 may each include only one sleeve connector 52 and valve cartridge connector 56, respectively. In yet further alternate examples, a valve cartridge connector and sleeve connector may be another configuration. For example, a valve cartridge connector may comprise an aperture, and a sleeve connector may comprise a protrusion receivable in the aperture.

In the example shown, the sleeve connector 52 and valve cartridge connector 56 are integrally formed with the sleeve 26 and the valve cartridge 32, respectively. In alternate examples, the sleeve connector 52 and/or valve cartridge connector 56 may be separately formed from the sleeve 26 and the valve cartridge 32, respectively.

The neck assembly 18 may further include one or more annular seals 68, which are separately formed from the valve cartridge 32 and the sleeve 26, and which may be disposed between any two of the sleeve 26, the valve cartridge 32, and the wall 11 of the fuel tank 13. The seals 68 may serve to prevent or reduce the risk of liquid and/or vapor from escaping from the fuel tank 13.

Referring to FIGS. 2 and 4, the seals 68 include a first annular seal 70 that is disposed between the sleeve 26 and the valve cartridge 32. Specifically, the valve cartridge 32 includes an outer surface 72 that is in facing relation to the inner surface 74 of the sleeve 26. The outer surface 72 includes an annular recess 76. The first annular seal 70 includes a gasket, o-ring, or other suitable resiliently flexible seal, that is seated in the annular recess 76, and is compressed between the valve cartridge 32 and the sleeve 26 to prevent the flow of fluid therebetween.

Referring still to FIGS. 2 and 4, the neck assembly 18 further includes a second annular seal 78 that is disposed between the valve cartridge 32 and the wall 11 of the fuel system component 10. Specifically, the valve cartridge 32 includes a shoulder 80 (shown in FIG. 4). The shoulder 80 is positioned in facing relation to an outer surface of the wall 11 of the fuel 10 tank, and includes an annular recess 82. The second annular seal 78 includes an o-ring, gasket, or other suitable resiliently flexible seal, that is seated in the annular recess 82, and is compressed between the shoulder 80 and the outer surface of the wall 11 of the fuel tank 13 to prevent the flow of fluid therebetween.

The first 70 and second 78 annular seals may be made from any suitable material that provides a liquid and vapor tight seal between the components. In one particular example, the first seal and/or the second seal may be made from a fluroelastomer.

In use, the neck assembly 18 may be assembled by securing the sleeve 26 and encapsulation ring 24 together, for example by laser welding, if they are separately formed. The encapsulation ring 24 may then be encapsulated in a wall 11 of the fuel tank 13 during blow molding of the fuel tank 13, such that the first end portion 28 of the sleeve 26 is positioned exterior to the fuel tank 13.

After encapsulation, a hole may have to be cut, drilled, or pierced in the wall 11 of the fuel tank 13, within the area of the encapsulation ring 24.

The first 70 and second 78 seals may be mounted to the valve cartridge 32 by seating the first seal 70 in the first recess 76 and seating the second seal 78 in the second recess 82. The valve assembly 44 may be secured to the second end portion 38 of the valve cartridge 32 by inserting the second end portion 38 of the valve cartridge 32 into the valve assembly 44, flexing the flaps 51 outwardly, positioning the apertures 50 over the protrusions 48, and allowing the flaps 51 to flex back inwardly, so that the protrusions 48 are received in the apertures 50.

The valve cartridge 32, with the annular seals 68 and valve assembly 44 mounted thereto, may then be mounted to the housing 20 by inserting the valve cartridge 32 into the sleeve 26 from the first end portion 28 of the sleeve 26 towards the second end portion 30, and securing and sealing the valve cartridge 32 to the sleeve 26. As described above, as the first end portion 36 of the valve cartridge approaches the first end portion 28 of the sleeve, the first end portion 28 of the sleeve 26 will enter the slot 66. The rim 55 will contact the protrusions 64, and force the flaps 65 to flex radially outwardly. As the valve cartridge 32 is slid further into the housing 26, the flaps 65 will snap radially inwardly, so that the protrusions 64 are inserted into the apertures 54. Further, during insertion, the first seal 70 will be compressed between the valve cartridge 32 and the sleeve 26, and the second seal 78 will be compressed between the shoulder 80 and the wall 11 of the fuel tank 13, to seal the valve assembly 44 to the sleeve 26 and the fuel tank 13.

A fuel filler pipe 12 may then be connected to the neck assembly 18 in any suitable manner, for example by using a worm gear clamp or a crimp style clamp.

In alternate examples (not shown), a neck assembly may be configured such that a quick connect coupling could be used to connect the neck assembly to the fuel filler pipe 12. In such examples, the neck assembly may be configured similarly to the neck assembly 18 described hereinabove, however the lip may be spaced from the first end portion of the valve cartridge, and may be positioned further towards the second end portion of the conduit.

Figure 7:
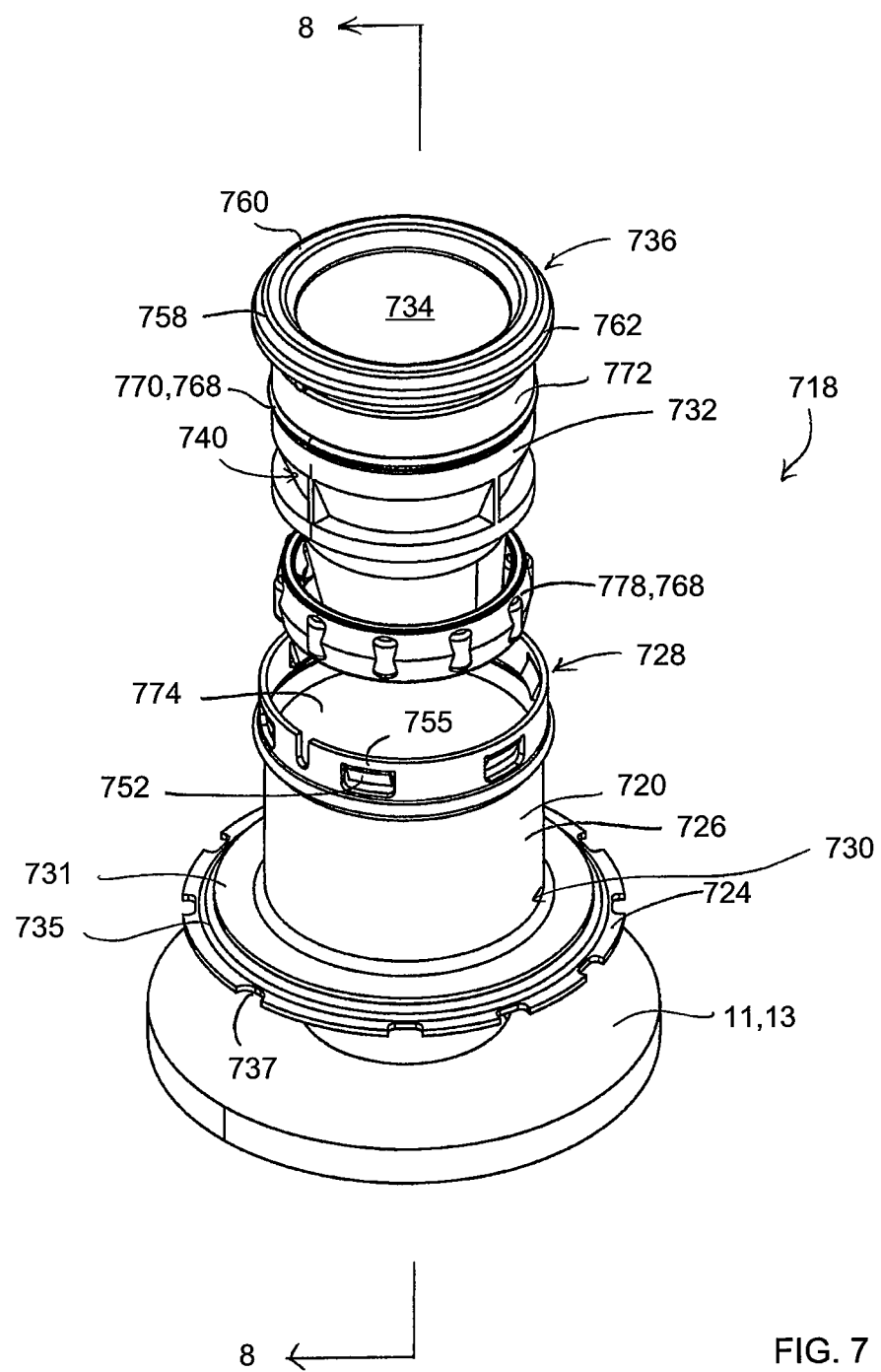
FIG. 7 is an exploded view of another neck assembly.
Figure 8:
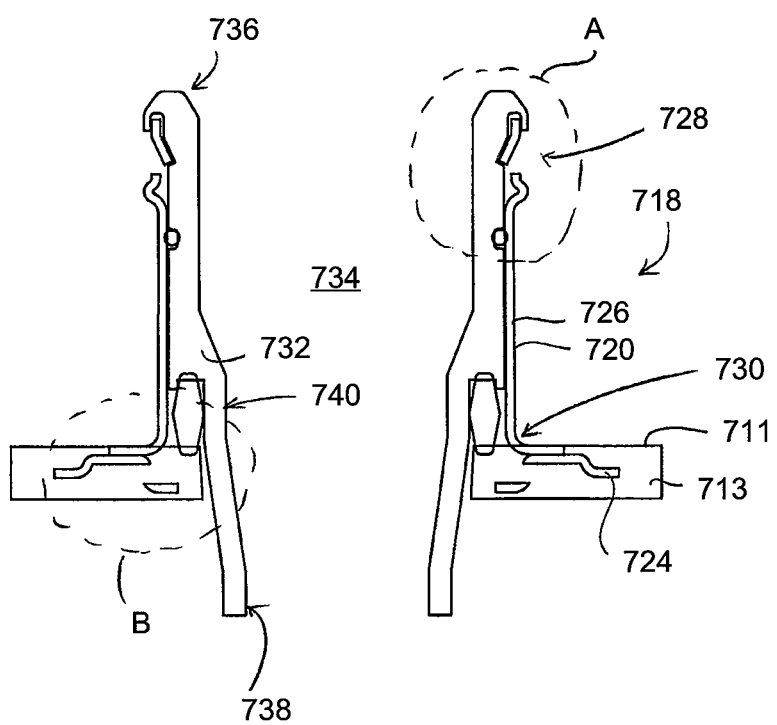
FIG. 8 is a cross-section taken along line 8-8 in FIG. 7, showing the neck assembly in the assembled configuration.
Figure 8A:
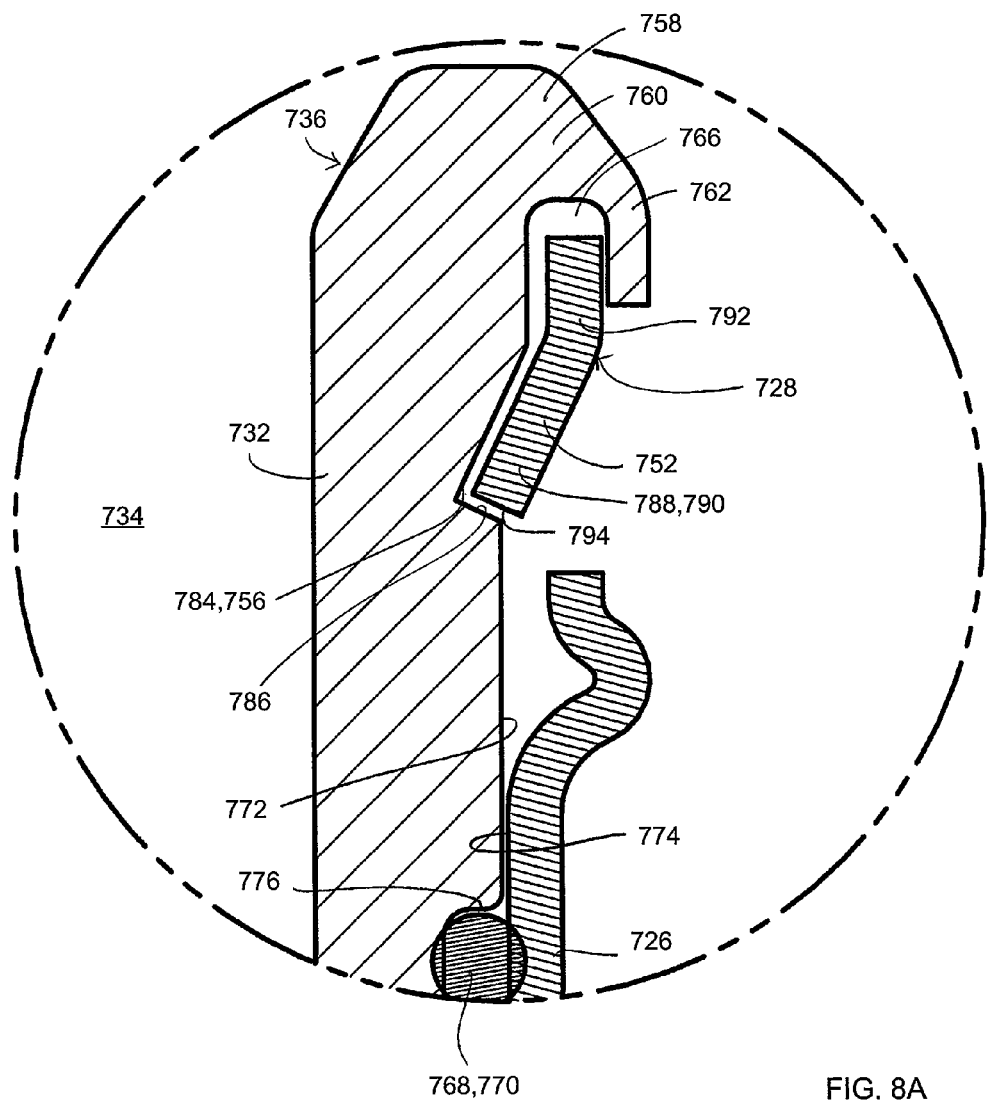
FIG. 8A is an enlarged view of the region shown in circle A of FIG. 8.
Figure 8B:
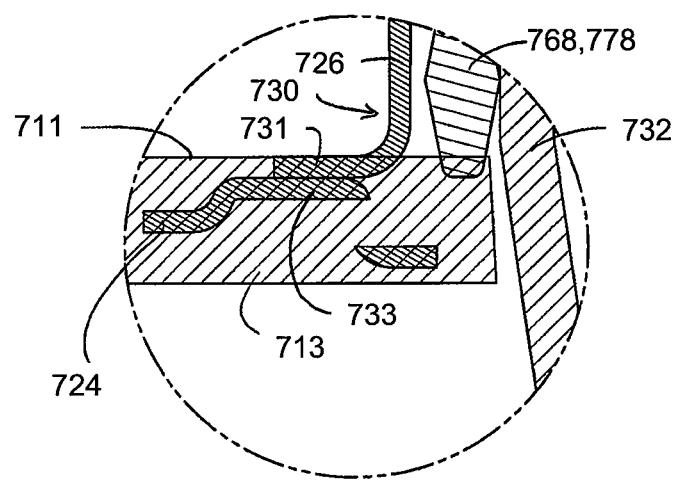
FIG. 8B is an enlarged view of the region shown in circle B of FIG. 8.

Another example of a neck assembly is shown in FIGS. 7 to 8B, in which like reference numerals have been used to refer to like features as in FIGS. 1 to 6, with the number seven (7) before each reference numeral. The neck assembly 718 is similar to the neck assembly 18, however, in the neck assembly 718, the sleeve connector 752 and valve cartridge connector 756 are configured differently from the sleeve connector 52 and valve cartridge connector 56 of FIGS. 1 to 6.

Specifically, referring to FIG. 8A, the valve cartridge connector 756 includes at least one recess 784 defined in an outer surface 772 of the valve cartridge 732. As exemplified, the valve cartridge connector 756 includes a single annular recess 784 extending around the outer surface 772 of the conduit 734. In alternate examples, the valve cartridge connector 756 may comprise a plurality of recesses extending around the outer surface 772 of the conduit 734. The recess 784 includes a base surface 786 facing towards the first end portion 728 of the conduit 734.

The sleeve connector 752 includes at least one portion that will bent into position so that it becomes a protrusion 788 extending inwardly from the sleeve 726 and protruding into the at least one recess 784. As exemplified, the protrusion 788 includes a plurality of tabs 790 extending inwardly from the sleeve 726 and protruding into the annular recess 784. The tabs 790 have a proximal end 792 connected to the sleeve 726, and an opposed distal end 794. The distal end 794 abuts the base surface 786 to secure the valve cartridge 732 to the housing 720.

In examples wherein the sleeve 726 is fabricated from a metal, the tabs 790 may comprise cutouts that are formed into the sleeve 726, and the tabs 790 may be crimped or bent into the recess 784 after the valve cartridge 732 is inserted into the housing 720. Alternately, the tabs 790 may be resiliently flexible, and may snap into the annular recess 782 as the valve cartridge 732 is inserted into the housing 720.

In FIGS. 7 to 8B, a valve assembly is not shown; however it will be appreciated that a valve assembly could be mounted to the second end portion 738 in the same manner as in FIGS. 1 to 4.

In the examples described above, the neck assemblies 18 and 718 extend generally perpendicular to the wall 11 of the fuel tank 13. In alternate examples, one or more of the parts of a neck assembly may extend at an angle to the wall 11 of the fuel tank 13. For example, a valve housing and valve cartridge may extend at an angle of 30° to the fuel tank.

The invention claimed is:

1. A neck assembly of a fuel system component comprising:
   a) a housing comprising (i) a cylindrical sleeve having a first end portion positioned exterior to the fuel system component and extending outwardly therefrom and a longitudinally opposed second end portion, and (ii) an encapsulation ring extending radially outwardly from the second end portion of the sleeve and encapsulated within a wall of the fuel system component;
   b) a valve cartridge at least partially received within the sleeve and secured thereto, the valve cartridge having a first end portion positioned exterior to the fuel system component and a longitudinally opposed second end portion, the valve cartridge defining a conduit for fluid flow;
   c) at least one separate annular seal disposed between any two of the sleeve, the valve cartridge, and the wall of the fuel system component.

2. The neck assembly of claim 1, wherein the at least one annular seal comprises a first seal disposed between the sleeve and the valve cartridge.

3. The neck assembly of claim 2, wherein:
   a) the valve cartridge comprises an outer surface and the sleeve comprises an inner surface;
   b) the outer surface of the valve cartridge is in facing relation to the inner surface of the sleeve;
   and c) at least one of the outer surface of the valve cartridge and the inner surface of the sleeve comprises a recess in which the first seal is seated.

4. The neck assembly of claim 2, further comprising a second annular seal disposed between the valve cartridge and the wall of the fuel system component.

5. The neck assembly of claim 4, wherein the valve cartridge comprises a shoulder positioned in facing relation to an outer surface of the wall of the fuel system component, and the second seal is disposed between the shoulder and the outer surface of the fuel system component.

6. The neck assembly of claim 5, wherein the shoulder comprises a recess in which the second seal is seated.

7. The neck assembly of claim 1, wherein the at least one annular seal is made from a resiliently flexible material.

8. The neck assembly of claim 1, wherein the housing further comprises at least one sleeve connector at the first end portion of the sleeve, and the valve cartridge further comprises at least one valve cartridge connector at the first end portion of the valve cartridge, and the valve cartridge connector is engaged with the sleeve connector to secure the valve cartridge to the housing.

9. The neck assembly of claim 1, wherein the sleeve is metal, and the encapsulation ring is laser welded to the sleeve.

10. The neck assembly of claim 1, wherein the second end portion of the valve cartridge extends out of the second end portion of the sleeve and is positioned within the fuel system component.

11. The neck assembly of claim 10, wherein the second end portion of the valve cartridge has a valve assembly mounted thereto.

12. The neck assembly of claim 1, wherein the second end portion of the valve cartridge includes a valve.

13. The neck assembly of claim 12, wherein the valve is selected from the group consisting of a rollover valve, a check valve, a fill limit vent valve, and a grade vent valve.

14. A neck assembly of a fuel system component comprising:
   a) a housing comprising (i) a cylindrical sleeve having a first end portion positioned exterior to the fuel system component and extending outwardly therefrom and a longitudinally opposed second end portion, (ii) an encapsulation ring extending outwardly from the second end portion of the sleeve and encapsulated within a wall of the fuel system component, and (iii) at least one sleeve connector at the first end portion of the sleeve; and
   b) a valve cartridge at least partially received within the sleeve, the valve cartridge defining a conduit for fuel flow and comprising (i) a first end portion positioned exterior to the fuel system component and a longitudinally opposed second end portion, and (ii) at least one valve cartridge connector at the first end portion of the valve cartridge, the valve cartridge connector engaged with the sleeve connector to secure the valve cartridge within the housing.

15. The neck assembly of claim 14, wherein the at least one sleeve connector is integral with the sleeve, and the at least one valve cartridge connector is integral with the valve cartridge.

16. The neck assembly of claim 14, wherein:
   a) the at least one valve cartridge comprises an outer surface;
   b) the at least one valve cartridge connector comprises at least one recess defined in the outer surface of the valve cartridge, and c) the at least one sleeve connector comprises at least one protrusion extending inwardly from the sleeve and protruding into the at least one recess.

17. The neck assembly of claim 16, wherein a) the at least one recess comprises a plurality of recesses extending around the outer surface of the valve cartridge; b) the at least one protrusion comprises a plurality of tabs extending inwardly from the sleeve; and c) each of the tabs protrudes into one of the recesses.

18. The neck assembly of claim 16, wherein the at least one recess comprises a single annular recess extending around the outer surface of the valve cartridge, and the at least one protrusion comprises a plurality of tabs extending inwardly from the sleeve and protruding into the annular recess.

19. The neck assembly of claim 18, wherein the single annular recess comprises a base surface facing towards the first end portion of the conduit, and the tabs have a proximal end connected to the sleeve and an opposed distal end that abuts the base surface.

20. The neck assembly of claim 18, wherein the sleeve is metal, and the plurality of tabs comprise cutouts that are bent into the single annular recess.

21. The neck assembly of claim 14, wherein the valve cartridge comprises a lip having a first portion extending laterally radially outwardly from the first end portion of the valve cartridge and a second portion extending axially towards the second end portion of the valve cartridge, the lip defining a slot in which the first end portion of the sleeve is received.

22. The neck assembly of claim 21, wherein the sleeve connector comprises at least one aperture formed through the first end portion of the sleeve, and the valve cartridge connector comprises at least one protrusion extending inwardly from the second portion of the lip and received within the aperture.

23. The neck assembly of claim 22, wherein the lip is resiliently flexible to allow for the protrusion to be removed from the aperture.

24. The neck assembly of claim 14, wherein the valve cartridge is removably secured within the housing.

25. A neck assembly of a fuel system component comprising:
a) a housing comprising (i) a cylindrical metal sleeve having a first end portion positioned exterior to the fuel system component and extending outwardly therefrom and a longitudinally opposed second end portion, and (ii) a metal encapsulation ring welded to the second end portion of the sleeve and extending radially outwardly from the second end portion of the sleeve, the encapsulation ring encapsulated within a wall of the fuel system component; and
b) a valve cartridge at least partially received within the sleeve and secured thereto, the valve cartridge defining a conduit for fuel flow and comprising a first end portion positioned exterior to the fuel system component and a longitudinally opposed second end portion.

26. A method for securing a neck assembly to a fuel system component, the method comprising:
a) providing a housing comprising i) a cylindrical sleeve having a first end portion and extending outwardly therefrom and a longitudinally opposed second end portion, and (ii) an encapsulation ring extending radially outwardly from the second end portion of the sleeve;
b) encapsulating the encapsulation ring in a wall of the fuel system component while blow-molding the fuel system component, whereby the first end portion of the sleeve is positioned exterior to the fuel system component;
c) providing a valve cartridge defining a conduit for fuel flow and comprising a first end portion and a longitudinally opposed second end portion;
d) inserting the valve cartridge into the sleeve from the first end portion of the sleeve towards the second end portion, whereby the first end portion of the valve cartridge is positioned exterior to the wall of the fuel system component; and
e) securing the valve cartridge to the sleeve.

27. The method of claim 26, further comprising sealing the valve cartridge to at least one of the sleeve and the wall of the fuel system component.

28. The method of claim 27, wherein sealing the valve cartridge to the sleeve comprises mounting at least one separate annular seal to the valve cartridge prior to step (d), and compressing the at least one annular seal between the valve cartridge and one of the sleeve and the wall of the fuel system component during step (e).

29. The method of claim 27, wherein sealing the valve cartridge to the sleeve comprises mounting a first separate annular seal and a second separate annular seal to the valve cartridge prior to step (d), and compressing the first annular seal between the valve cartridge and the sleeve and the second annular seal between the valve cartridge and the wall of the fuel system component during step (e).

30. The method of claim 26 wherein:
a) the first end portion of the sleeve comprises at least one tab;
b) the valve cartridge comprises an outer surface and the first end portion of the valve cartridge comprises at least one recess formed in the outer surface; and
c) step (e) comprises crimping the at least one tab into the at least one recess.

31. The method of claim 26, wherein the valve cartridge comprises a lip having a first portion extending radially outwardly from the first end portion of the valve cartridge and a second portion extending axially towards the second end portion of the valve cartridge, the lip defining a slot, and the method further comprises inserting the first end portion of the sleeve into the slot while inserting the valve cartridge into the sleeve.

32. The method of claim 31, wherein at least one aperture is formed through the first end portion of the sleeve, at least one protrusion extends inwardly from the second portion of the lip, and step (e) comprises snapping the protrusion into the aperture while inserting the valve cartridge into the sleeve.

33. The method of claim 26, wherein the sleeve is metal, the encapsulation ring is metal, and step (a) comprises laser welding the encapsulation ring to the second end portion of the sleeve.

34. The method of claim 26, further comprising mounting a valve assembly to the second end portion of the conduit prior to inserting the conduit into the sleeve.

* * * * *